US012617277B2

(12) United States Patent
Yueh et al.

(10) Patent No.: US 12,617,277 B2
(45) Date of Patent: *May 5, 2026

(54) DISPLAY DEVICE

(71) Applicant: InnoLux Corporation, Miao-Li County (TW)

(72) Inventors: Jui-Jen Yueh, Miao-Li County (TW); Tsung-Han Tsai, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 2 days.

This patent is subject to a terminal disclaimer.

(21) Appl. No.: 18/752,817

(22) Filed: Jun. 25, 2024

(65) Prior Publication Data

US 2024/0343116 A1     Oct. 17, 2024

Related U.S. Application Data

(63) Continuation of application No. 17/704,015, filed on Mar. 25, 2022, now Pat. No. 12,071,013.

(30) Foreign Application Priority Data

Apr. 25, 2021     (CN) .......................... 202110449484.8

(51) Int. Cl.
| | |
|---|---|
| *B60K 35/60* | (2024.01) |
| *B60K 35/22* | (2024.01) |
| *B60K 35/40* | (2024.01) |

(52) U.S. Cl.
CPC .............. *B60K 35/60* (2024.01); *B60K 35/22* (2024.01); *B60K 35/415* (2024.01); *B60K 2360/332* (2024.01)

(58) Field of Classification Search
CPC ...... B60K 35/22; B60K 35/60; B60K 35/415; B60K 2360/332; B60K 35/425; B60K 2360/1523; B60K 2360/1526; B60K 2360/25; G09F 9/00; H10H 29/142; H10K 59/50
See application file for complete search history.

(56) References Cited

U.S. PATENT DOCUMENTS 12,071,013 B2 *  8/2024  Yueh ...................... B60K 35/22

* cited by examiner

*Primary Examiner* — Daryl C Pope
(74) *Attorney, Agent, or Firm* — Winston Hsu

(57) ABSTRACT

A display device includes a light emitting element disposed in a region adjacent to a transflective object in a vehicle and a light controlling means disposed on a route that a first light and a second light emitted from the light emitting element propagate. The first light is controlled to propagate out of the display device at a first angle ranged from 30 to 45 degrees and toward the transflective object and the second light is controlled to propagate out of the display device at a second angle ranged from 0 to 5 degrees. The first angle and the second angle are between a normal direction of the display device and the first light and the second light controlled through the light controlling means respectively. A first ratio of a light intensity of the first light to that of the second light is less than or equal to 14%.

10 Claims, 10 Drawing Sheets

DISPLAY DEVICE

CROSS REFERENCE TO RELATED APPLICATIONS

This application is a continuation application of U.S. application Ser. No. 17/704,015, filed on Mar. 25, 2022. The content of the application is incorporated herein by reference.

BACKGROUND OF THE DISCLOSURE

1. Field of the Disclosure

The present disclosure is related to a display device, and more particularly, to a display device with a light controlling means.

2. Description of the Prior Art

With the evolution of the automotive technology, a role of vehicle display devices in driving vehicles has become increasingly important. However, light emitted by the vehicle display device may cause reflections after being reflected by a windshield or car windows, thereby affecting the driver's line of sight, making it impossible for a driver to see road conditions or side mirrors. Therefore, how to improve the reflection to ensure driving safety has become an important problem to be solved.

SUMMARY OF THE DISCLOSURE

According to one embodiment of the invention, a display device having a first region adjacent to a transflective object in a vehicle is provided. The display device includes a first light emitting element disposed in the first region and a light controlling means disposed on a route that a first light and a second light emitted from the first light emitting element propagate, through which the first light is controlled to propagate out of the display device at a first angle ranged from 30 degrees to 45 degrees and toward the transflective object and the second light is controlled to propagate out of the display device at a second angle ranged from 0 degrees to 5 degrees. Wherein, the first angle is between a normal direction of the display device and the first light controlled through the light controlling means, and the second angle is between the normal direction of the display device and the second light controlled through the light controlling means. A first ratio of a light intensity of the first light to that of the second light is less than or equal to 14%.

These and other objectives of the present disclosure will no doubt become obvious to those of ordinary skill in the art after reading the following detailed description of the embodiment that is illustrated in the various figures and drawings.

DETAILED DESCRIPTION

Figure 1:
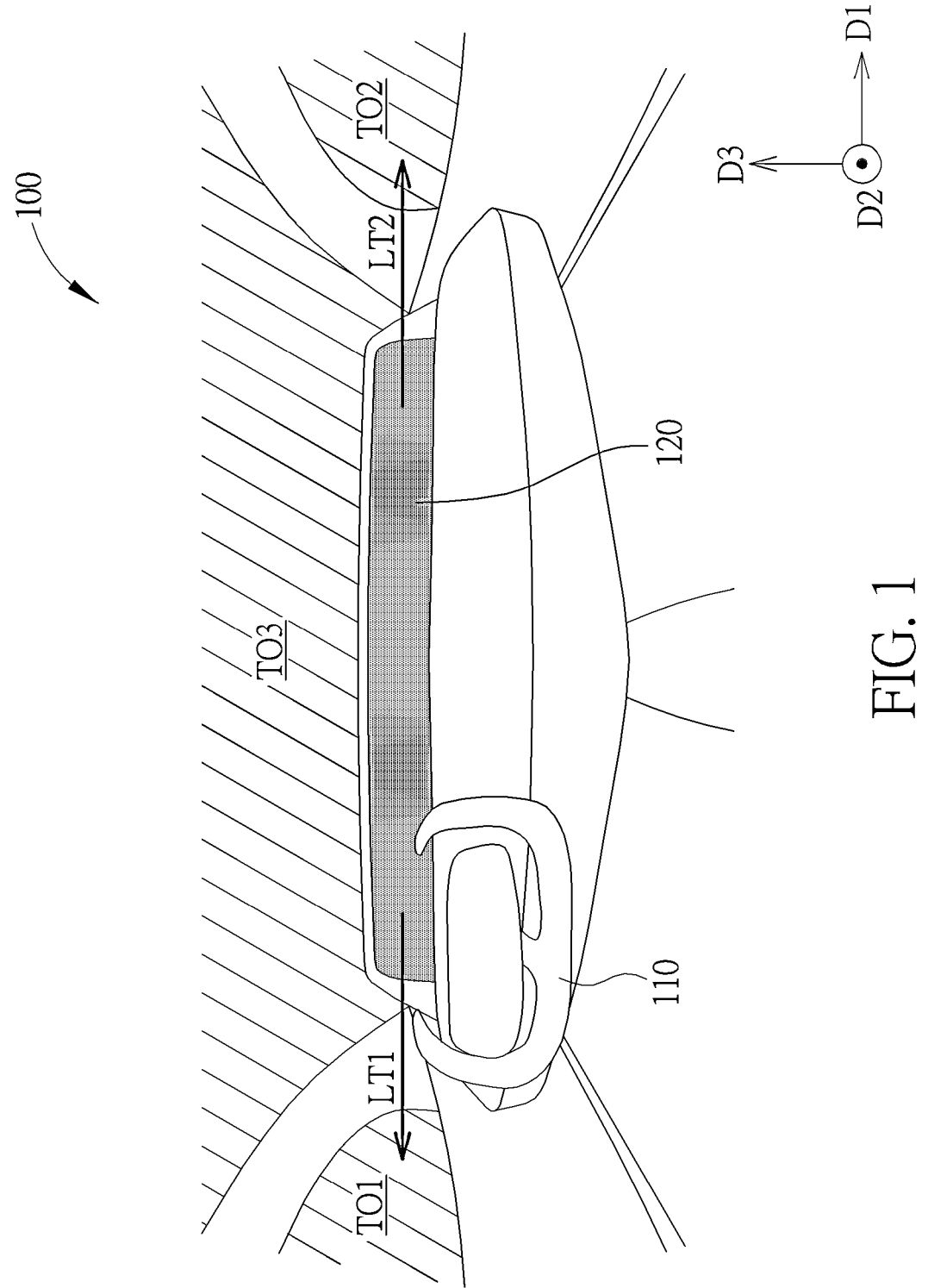
FIG. 1 is a schematic diagram of an interior of a vehicle according to an example of the present invention.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As those skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

The directional terms mentioned in the following description, e.g., "on", "below", "front", "rear", "left", "right", etc., are only directions with reference to the drawings. Accordingly, the directional terms are used to illustrate, but not to limit this disclosure. In the drawings, each drawing depicts the general features of the methods, structures and/or materials used in specific embodiments. However, these drawings should not be construed as defining or limiting the scope or nature covered by these embodiments. For example, for the sake of clarity, the relative size, the thickness and the position of each layer, region and/or structure may be reduced or enlarged.

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented. The electrical connection may be a direct electrical connection or an indirect electrical connection through other components. The terms of joining and connecting may include the case that both structures are movable or both structures are fixed.

The term of "equal to" or "substantially usually means falling within 20% of a given value or range, or means falling within 10%, 5%, 3%, 2%, 1% or 0.5 of a given value or range.

The term of "in the range from the first value to the second value" means that the range includes the first value, the second value and other values between the first value and the second value.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

FIG. 1 is a schematic diagram of an interior of a vehicle 100 according to an example of the present invention. The interior of the vehicle 100 is a scene seen by an user sitting in a driver's seat, a front passenger's seat or a rear seat, and comprises a steering wheel 110, a display device 120, a transflective object TO1, a transflective object TO2 and a transflective object TO3. In FIG. 1, a first direction D1, a second direction D2 and a third direction D3 of the direction axes are perpendicular to each other. In one example, the first direction D1 is a direction in which a horizontal viewing angle is measured. The steering wheel 110 is disposed in front of the driver's seat, and the display device 120 is disposed in front of the steering wheel 110. The transflective object TO1, the transflective object TO2 and the transflective object TO3 may be made of glass (or other transparent materials), and are disposed on the left side, on the right sides and in front of the front seat of the vehicle 100, respectively. A light generated by the display device 120 may diverge through a plurality of angles. The light (e.g., a light LT1 and a light LT2) that diverge through a specific angle may be reflected by the transflective object TO1, the transflective object TO2 and/or the transflective object TO3, and affects the driver's line of sight. In one example, the display device 120 may be bar-shaped. A ratio of a length to a width of the display device 120 may be greater than or equal to 2. In one example, the display device 120 may have other arbitrary shapes. In one example, the transflective object TO1, the transflective object TO2 and the transflective object TO3 may be car windows and a windshield, respectively, but are not limited herein.

Figure 2:
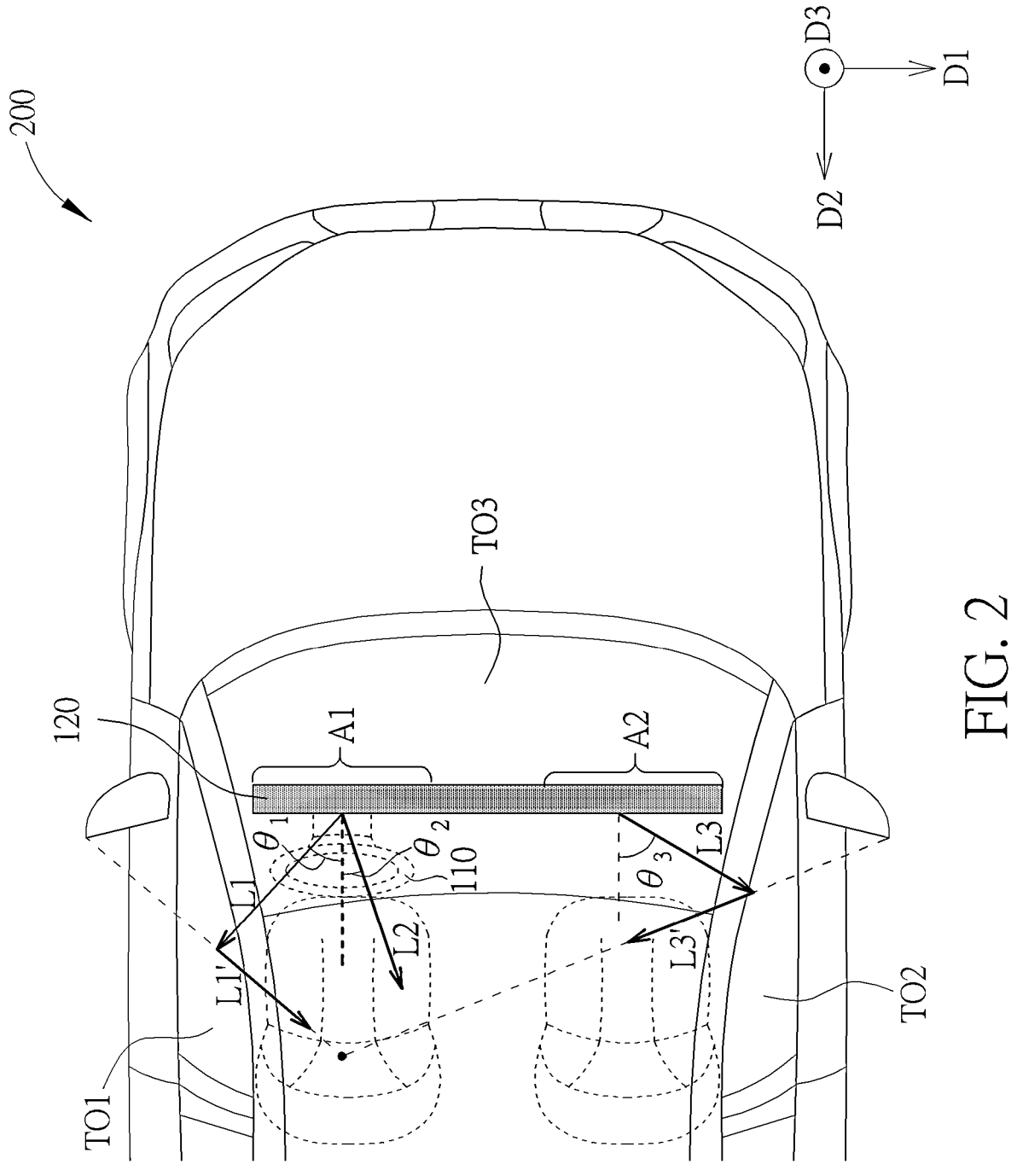
FIG. 2 is a top-view schematic diagram of a vehicle according to an example of the present invention.

FIG. 2 is a top-view schematic diagram of a vehicle 200 according to an example of the present invention. A structure of the vehicle 200 is similar to a structure of the vehicle 100, and is not narrated herein. The display device 120 may comprise a first area A1 and a second area A2. The first area A1 is adjacent to the transflective object TO1. In other words, the first area A1 is closer to the transflective object TO1 than the second area A2. The second area A2 is adjacent to the transflective object TO2. In other words, the second area A2 is closer to the transflective object TO2 than the first area A1. In the first area A1, the display device 120 may generate a light L1 and a light L2. The light L1 propagates to the transflective object TO1, and a reflection light L1' is generated by a reflection of the transflective object TO1. The reflection light L1' may propagate to the user's eyes. The light L2 may propagate in the second direction D2. An included angle between the light L1 and a normal direction of the display device 120 is an angle $\theta_1$, and an included angle between the light L2 and the normal direction of the display device 120 is an angle $\theta_2$. In the second area A2, the display device 120 may generate a light L3. The light L3 propagates to the transflective object TO2, and a reflection light L3' is generated by a reflection of the transflective object TO2. The reflection light L3' may propagate to the user's eyes. An included angle between the light L3 and the normal direction of the display device 120 is an angle $\theta_3$. In one example, the angle $\theta_1$ is ranged from 30 degrees to 45 degrees, the angle $\theta_2$ is ranged from 0 degrees to 5 degrees, and the angle $\theta_3$ is ranged from 55 degrees to 70 degrees, but are not limited herein. In one example, the display device 120 may be a single display device. In one example, the display device 120 may be composed of a plurality of display devices, for example, the first area A1 is a display device and the second area A2 is another display device.

In one example, a ratio $R_1$ of a light intensity $I_1$ of the light L1 to a light intensity Is of the light L2 is less than or equal to 14%. For example, since the angle $\theta_1$ is in the range from 30 degrees to 45 degrees and the angle $\theta_2$ is in the range from 0 degrees to 5 degrees, the angle $\theta_1$ may be arbitrarily selected from the range from 30 degrees to 45 degrees to obtain the light intensity $I_1$, and the angle $\theta_2$ may be arbitrarily selected from the range from 0 degrees to 5 degrees to obtain the light intensity $I_2$. Then, the ratio $R_1$ may be obtained. In one example, a ratio $R_2$ of a light intensity $I_3$ of the light L3 to the light intensity $I_2$ of the light L2 is less than or equal to 23%. In one example, a ratio $R_3$ of a light intensity $I_1'$ of the light reflection L1' to the light intensity 12 of the light L2 is less than or equal to 18. In one example, a ratio $R_4$ of a light intensity $I_3'$ of the reflection light L3' to the light intensity $I_2$ of the light L2 is less than or equal to 18. The ratios $R_1$-$R_4$ may conform to the following relational expressions (1)-(4):

$$R_1 = \frac{I_1}{I_2} \le 14\% \tag{1}$$

$$R_2 = \frac{I_3}{I_2} \le 23\% \tag{2}$$

$$R_3 = \frac{I_1'}{I_2} \le 1\% \tag{3}$$

$$R_4 = \frac{I_3'}{I_2} \le 1\% \tag{4}$$

In one example, the ratio $R_1$ of the light intensity $I_1$ of the light L1 to the light intensity $I_2$ of the light L2 is less than or equal to 11%. In one example, the ratio $R_2$ of the light intensity $I_3$ of the light L3 to the light intensity $I_2$ of the light L2 is less than or equal to 18%. In one example, the ratio $R_3$ of the light intensity $I_1'$ of the reflection light L1' to the light intensity $I_2$ of the light L2 is less than or equal to 0.8%. In one example, the ratio $R_4$ of the light intensity $I_3'$ of the reflection light L3' to the light intensity $I_2$ of the light L2 is less than or equal to 0.88. The ratios $R_1$-$R_4$ may conform to the following relational expressions (5)-(8):

$$R_1 = \frac{I_1}{I_2} \le 11\% \tag{5}$$

$$R_2 = \frac{I_3}{I_2} \le 18\% \tag{6}$$

$$R_3 = \frac{I_1'}{I_2} \le 0.8\% \tag{7}$$

-continued $$R_4 = \frac{I_3'}{I_2} \leq 0.8\% \tag{8}$$

There are various ways to measure the light intensity. In one example, a measurement device (e.g., a spectroradiometer) and a position to be measured of the display device 120 are kept at a fixed distance (e.g., a distance of 500 mm). By rotating the display device 120 or moving the measurement device, light intensities of lights at different angles are measured. In one example, the display device 120 may be fixed, and a measurement device (e.g., a conometer) is closely attached to the display device 120. The measurement device may directly measure the light intensities of the lights at different angles to the display device 120. In one example, in the case that the display device 120 displays the same screen, a measurement device measures the light intensities of the lights at different angles.

In one example, the display device 120 comprises a first light emitting unit and a light controlling means. The first light emitting unit is disposed in the first region A1. The light controlling means is disposed on a route that the light L1 and the light L2 emitted from the first light emitting unit propagate. The light L1 and the light L2 are controlled through the light controlling means. For example, the light L1 is controlled to propagate out of the display device 120 at an angle ranged from 30 degrees to 45 degrees and toward the transflective object TO1, and the light L2 is controlled to propagate out of the display device 120 at an angle ranged from 0 degrees to 5 degrees. In one example, the display device 120 comprises a second light emitting unit. The second light emitting unit is disposed in the second region A2. The light controlling means is disposed on a route that the light L3 emitted from the second light emitting unit propagates. The light L3 is controlled through the light controlling means. For example, the light L3 is controlled to propagate out of the display device 120 at an angle ranged from 55 degrees to 70 degrees and toward the transflective object TO2. In one example, the display device 120 may comprise, for example, a liquid crystal display (LC), a light emitting diode (LED), fluorescence, a phosphor, a quantum dot (QD), other suitable materials or a combination of the above materials, but is not limited herein. In one example, the LED may comprise, for example, an organic LED (OLED), an inorganic LED, a sub-millimeter LED (a mini LED), a micro LED, a quantum dot LED (QLED or QDLED), other suitable materials or a combination of the above materials, but is not limited herein. In one example, the display device 120 may have peripheral systems, e.g., a driving system, a control system, a light source system, and a shelf system, but is not limited herein. In one example, the display device 120 may comprise a single display panel. In one example, the display device 120 may be composed of a plurality of display panels. For example, the display device 120 comprises a first display panel and a second display panel, wherein the first light emitting unit corresponds to the first display panel and the second light emitting unit corresponds to the second display panel. The first display panel and the second display panel may be the same or different, but not limited herein.

Figure 3:
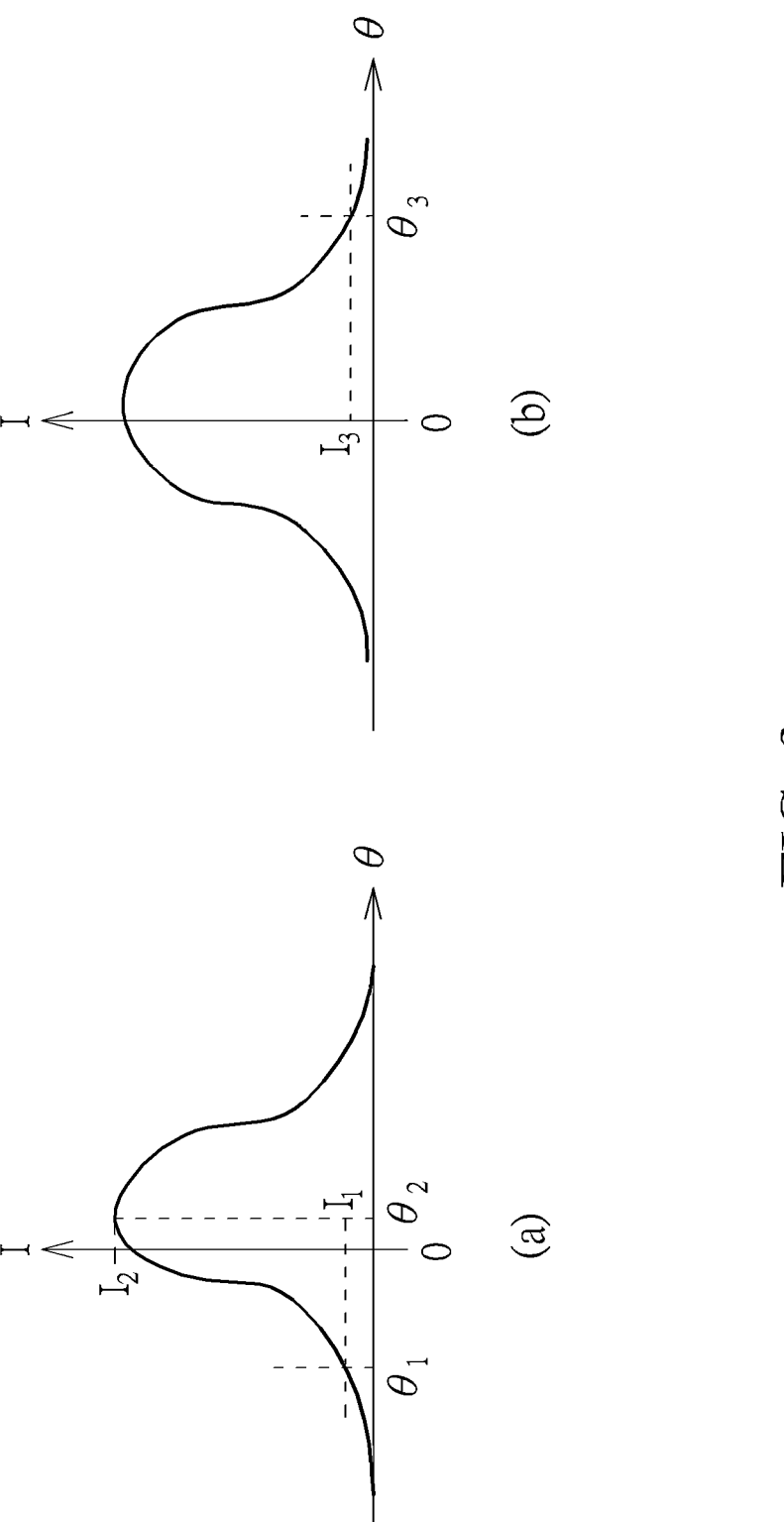
FIG. 3(a) and FIG. 3(b) are schematic diagrams of a relationship between an angle and a light intensity according to examples of the present invention.

FIG. 3(a) and FIG. 3(b) are schematic diagrams of a relationship between an angle θ and a light intensity I according to examples of the present invention. A horizontal axis and a vertical axis are the angle θ and the light intensity I, respectively. FIG. 3(a) and FIG. 3(b) represent different light intensities I corresponding to different angles θ of the light measured by the measurement device at the position to be measured. The angle θ with 0 degrees represents the normal direction of the display device 120 (the second direction D2). FIG. 3(a) shows a measurement result measured by the display device 120 in FIG. 2 in the first area A1. In FIG. 3(a), the corresponding light intensity is I when the angle of the light L1 is $\theta_1$, and the corresponding light intensity is $I_2$ when the angle of the light L2 is $\theta_2$.

FIG. 3(b) shows a measurement result measured by the display device 120 in FIG. 2 in the second area A2. In FIG. 3(b), the corresponding light intensity is $I_3$ when the angle of the light L3 is $\theta_3$.

Figure 4:
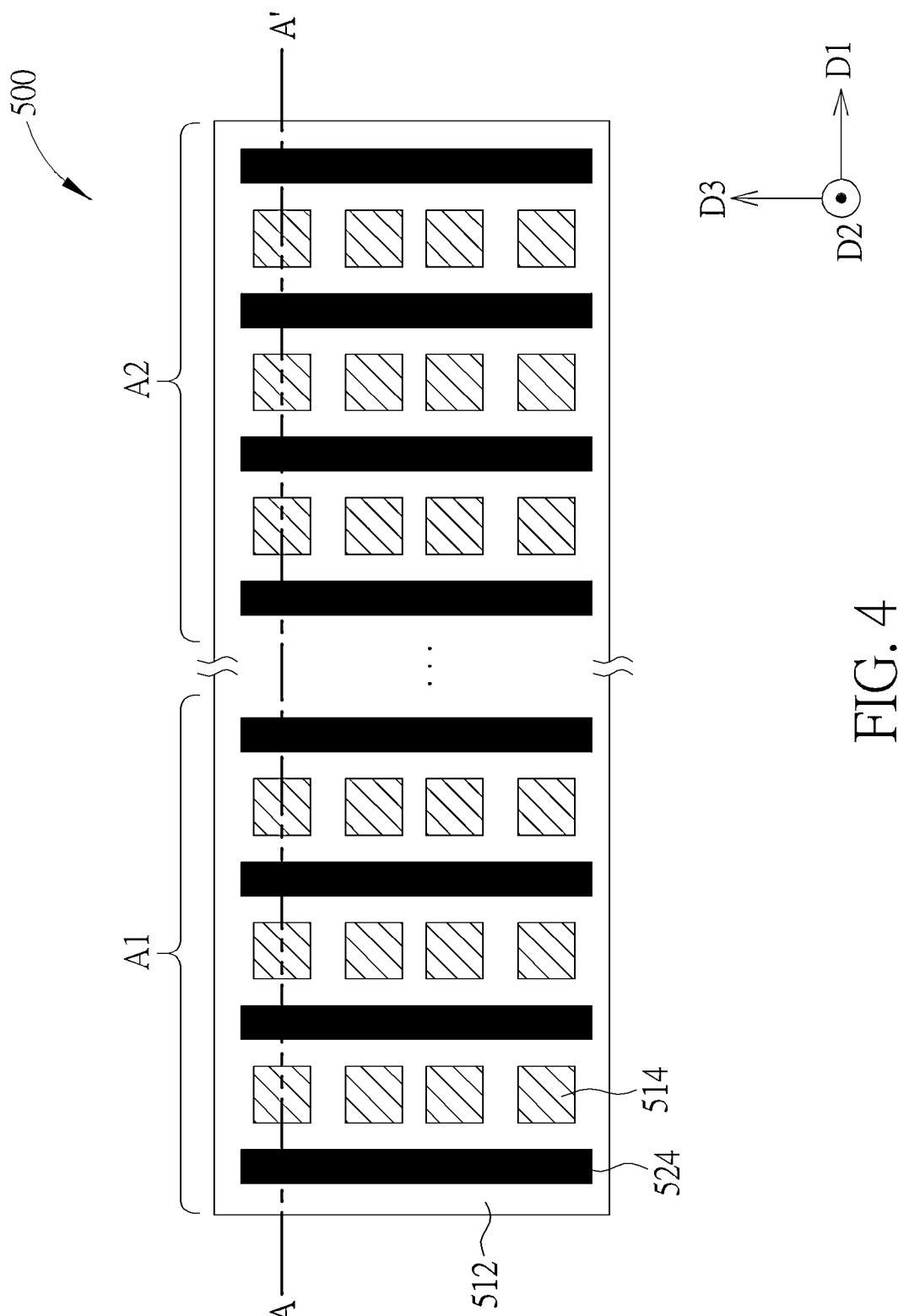
FIG. 4 is a top-view schematic diagram of a display device according to an example of the present invention.
Figure 5:
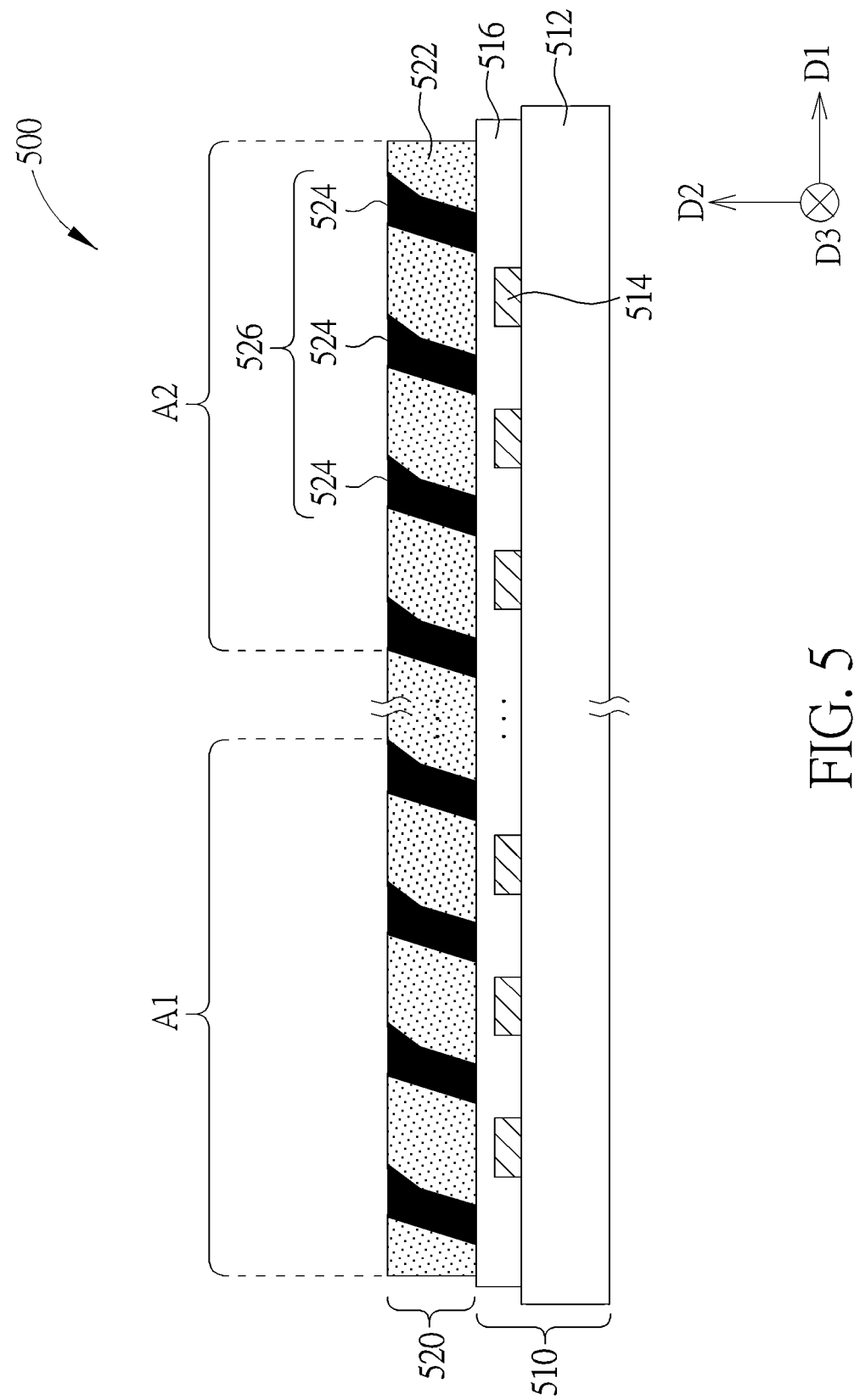
FIG. 5 is a cross-sectional schematic diagram of a display device according to an example of the present invention.

Referring to FIG. 4 and FIG. 5, FIG. 4 is a top-view schematic diagram of a display device 500 according to an example of the present invention. FIG. 5 is a cross-sectional schematic diagram of the display device 500 according to an example of the present invention, e.g., FIG. 5 is the schematic cross-sectional schematic diagram of the display device 500 along a line AA' in FIG. 4. The display device 500 may be used for implementing the display device 120 in FIG. 2, but is not limited herein. The display device 500 may comprise a first area A1 and a second area A2 (corresponding to the first area A1 and the second area A2 in FIG. 2). The display device 500 may comprise a light emitting unit 510 and a light controlling means 520. The light controlling means 520 is disposed on the light emitting unit 510. The light emitting unit 510 comprises a substrate 512, a plurality of light emitting elements 514, and an encapsulation layer 516. The plurality of light emitting elements 514 disposed on the substrate 512 is used for generating a light(s) (e.g., the light L1, the light L2 and the light L3 in FIG. 2). The encapsulation layer 516 disposed on the substrate 512 and the plurality of light emitting elements 514 is used for encapsulating the plurality of light emitting elements 514. The light controlling means 520 comprises a plurality of insulators 522 and a collimator 526. The collimator 526 has a plurality of collimating walls 524. The plurality of insulators 522 are used for penetrating the light(s), and the plurality of collimating walls 524 are used for blocking the light(s) and/or controlling an angle(s) of a light propagation(s). That is, the light emitting unit 510 generates the light(s), and the light controlling means 520 controls the angle(s) at which the light(s) propagates (i.e., limits a horizontal viewing angle of the display device 500). A penetration rate of the plurality of insulators 522 is greater than a penetration rate of the plurality of collimating walls 524. In one example, the substrate 512 may comprise a flexible substrate, a rigid substrate or a combination of the above substrates. The material of the flexible substrate may comprise, for example, polyimide (PI), polycarbonate (PC), polyethylene terephthalate (PET), other suitable materials or a combination of the above materials. The material of the rigid substrate may comprise, for example, glass, ceramic, quartz, sapphire or a combination of the above materials. In one example, the plurality of collimating walls 524 may be light-absorbing materials, for example, opaque black resin, opaque gray resin, opaque white resin, metal, other suitable materials or a combination of the above materials, but are not limited herein. In one example, the plurality of insulators 522 may be transparent materials, for example, acrylate resin, polycarbonate resin, polyurethane resin, polyimide resin, other suitable materials or a combination of the above materials, but are not limited herein. In one example, the plurality of light emitting elements 514 and the plurality of collimating walls 524 may or may not overlap in the second direction D2, but is not limited herein. If the display device 500 is applied to the display device 120 in FIG. 2, in FIG.

2, the ratio of the light intensity $I_1$ of the light L1 and the light intensity $I_2$ of the light L2 may be less than or equal to 148, and the ratio of the light intensity $I_3$ of the light L3 and the light intensity Is of the light L2 may be less than or equal to 23%.

In one example, the light emitting unit 510 may comprise a driving circuit disposed in the encapsulation layer 516. In one example, if the display device 500 is a blue light display, the light emitting unit 510 may comprise a light conversion layer, for example, a QD and/or a color filter (CF), but is not limited herein. In one example, if the display device 500 is a LED display, the light emitting unit 510 may comprise at least one LED. In one example, if the display device 500 is a LC display, the light emitting unit 510 may be a backlight module. The backlight module may comprise a light source and an optical film. The optical film may comprise, for example, a diffuser, a brightness enhancement film (BEF) and a light guide plate (LGP), but is not limited herein.

Figure 6:
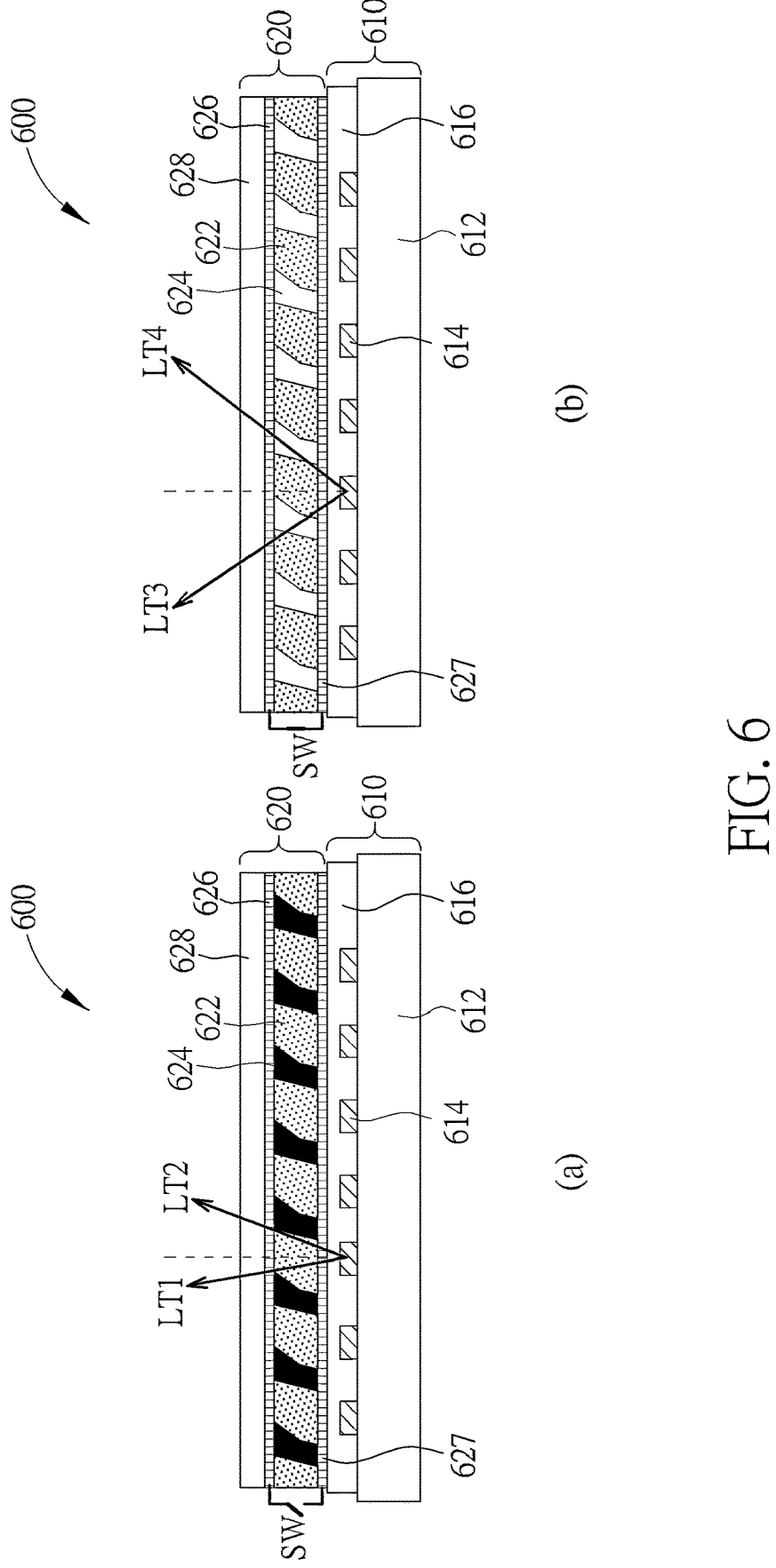
FIG. 6(a) and FIG. 6(b) are cross-sectional schematic diagrams of a display device according to an example of the present invention.

FIG. 6(a) and FIG. 6(b) are cross-sectional schematic diagrams of a display device 600 according to an example of the present invention. In FIG. 6, the display device 600 comprises a light emitting unit 610 and a light controlling means 620. The light controlling means 620 is disposed on the light emitting unit 610. The light emitting unit 610 comprises a substrate 612, a plurality of light emitting elements 614 and an encapsulation layer 616. The light controlling means 620 comprises a plurality of insulators 622, a plurality of collimating walls 624, an electrode 626, an electrode 627, a protective layer 628 and a switch SW. A structure of the light emitting unit 610 is the same as or similar to a structure of the light emitting unit 510 in FIG. 5, and is not narrated herein. The plurality of insulators 622 and the plurality of collimating walls 624 are disposed between the electrode 626 and the electrode 627. The switch SW is electrically connected to the electrode 626 and the electrode 627. The electrode 626 and the electrode 627 are matched with the on and the off of the switch SW to provide an electricity for controlling the plurality of collimating walls 624. The protective layer 628 may be, for example, a substrate. The material of the protective layer 628 is the same as or similar to that of the substrate 512, which can be referred to the above description and is not be narrated herein. In one example, the plurality of collimating walls 624 may comprise, for example, switchable light-absorbing material, e.g., electrochromic material, polymer-dispersed liquid crystal (PDLC), suspended particles, electrophoretic color particles, other suitable materials or a combination of the above materials, but is not limited herein. In one example, the plurality of insulators 622 are, for example, transparent materials. The transparent materials can be referred to the above description, which is not narrated herein.

In FIG. 6(a), when the switch SW is turned off (i.e., there is no electricity passing through the light controlling means 620), the plurality of collimating walls 624 may be light-absorbing materials, which block the light (e.g., the light LT1 and the light LT2) generated by the light emitting unit 610, to control the angle of the light propagation. In this situation, the penetration rate of the plurality of insulators 622 is greater than that of the plurality of collimating walls 624. In FIG. 6(b), when the switch SW is turned on (i.e., there is the electricity passing through the light controlling means 620), the plurality of collimating walls 624 may be light-transmitting materials (or transparent materials). In this situation, the penetration rate of the plurality of insulators 622 is greater than that of the plurality of collimating walls 624. The penetration rate of the plurality of collimating walls 624 when the switch SW is turned on is greater than that of the plurality of collimating walls 624 when the switch SW is turned off. The light generated by the light emitting unit 610 (e.g., the light LT3 and the light LT4) may penetrate the plurality of insulators 622 and the plurality of collimating walls 624, and the angle of the light propagation is relatively unrestricted. That is, compared with the angle of the light propagation in FIG. 6(b), the angle of the light propagation in FIG. 6(a) controlled by the plurality of collimating walls 624 is smaller (a smaller viewing angle), which can reduce a probability of a light reflection. In one example, the user may use the display device 600 in FIG. 6(a), when the vehicle is running, to ensure driving safety. The user may use the display device 600 in FIG. 6(b), when the vehicle is stationary, to increase the viewing angle and/or the light intensity of the light of the display device 600. In one example, when the switch SW is turned off, the plurality of collimating walls 624 may be the light-transmitting materials. When the switch SW is turned on, the plurality of collimating walls 624 may be the light-absorbing materials. Thus, the electricity may be applied to the light controlling means 620 to control the angle of the light generated by the light emitting unit 610. In one example, an electric current may be applied to the light controlling means 620 to control the angle of the light generated by the light emitting unit 610, but is not limited herein.

Figure 7:
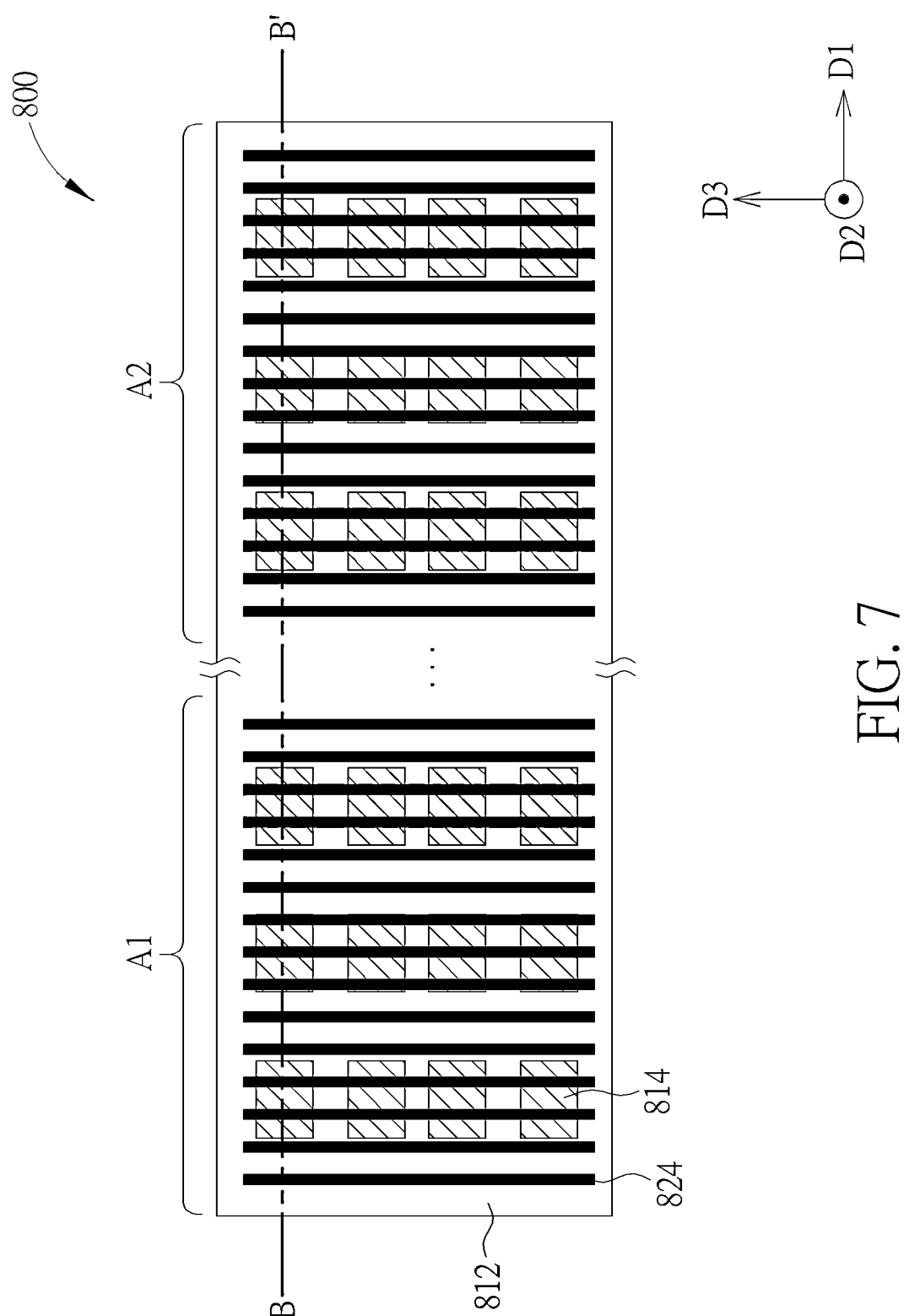
FIG. 7 is a top-view schematic diagram of a display device according to an example of the present invention.
Figure 8:
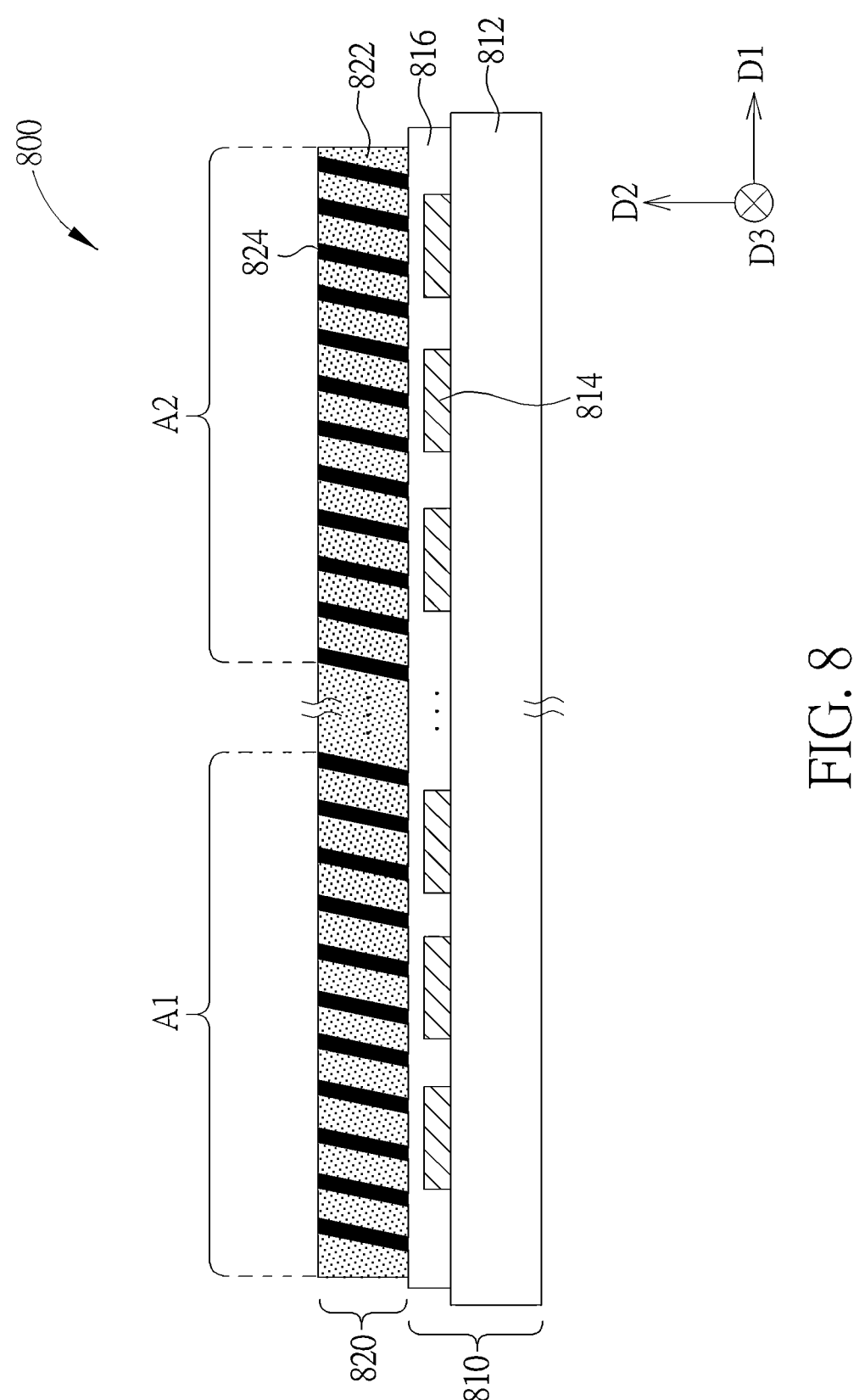
FIG. 8 is a cross-sectional schematic diagram of a display device according to an example of the present invention.

Referring to FIG. 7 and FIG. 8, FIG. 7 is a top-view schematic diagram of a display device 800 according to an example of the present invention. FIG. 8 is a cross-sectional schematic diagram of the display device 800 according to an example of the present invention, e.g., FIG. 8 is the cross-sectional schematic diagram of the display device 800 along a line BB' in FIG. 7. The display device 800 may be used for implementing the display device 120 in FIG. 2, but is not limited herein. The display device 800 may comprise a first area A1 and a second area A2 (corresponding to the first area A1 and the second area A2 in FIG. 2). The display device 800 may comprise a light emitting unit 810 and a light controlling means 820. The light controlling means 820 is disposed on the light emitting unit 810. The light emitting unit 810 comprises a substrate 812, a plurality of light emitting elements 814, and an encapsulation layer 816. The plurality of light emitting elements 814 disposed on the substrate 812 is used for generating a light(s) (e.g., the light L1, the light L2 and the light L3 in FIG. 2). The encapsulation layer 816 disposed on the substrate 812 and the plurality of light emitting elements 814 is used for encapsulating the plurality of light emitting elements 814. The light controlling means 820 comprises a plurality of insulators 822 and a plurality of collimating walls 824. The plurality of insulators 822 are used for penetrating the light(s), and the plurality of collimating walls 824 are used for blocking the light(s). That is, the light emitting unit 810 generates the light(s), and the light controlling means 820 controls the angle(s) at which the light(s) propagates (i.e., limits a horizontal viewing angle of the display device 800). If the display device 800 is applied to the display device 120 in FIG. 2, in FIG. 2, the ratio of the light intensity $I_1$ of the light L1 and the light intensity Is of the light L2 may be less than or equal to 14%, and the ratio of the light intensity Is of the light L3 and the light intensity Is of the light L2 may be less than or equal to 23%. In one example, the plurality of collimating walls 824 may be light-absorbing materials. The light-absorbing materials can be referred to the above description, and is not narrated herein. In one example, the plurality of light emitting elements 814 and the plurality of collimating walls 824 may or may not overlap, but is not limited herein. The examples in FIG. 4 may be applied to the examples in FIG. 7, and is not narrated herein. The examples in FIG. 5 and FIG. 6 may be applied to the examples in FIG. 8, and is not narrated herein.

Figure 9:
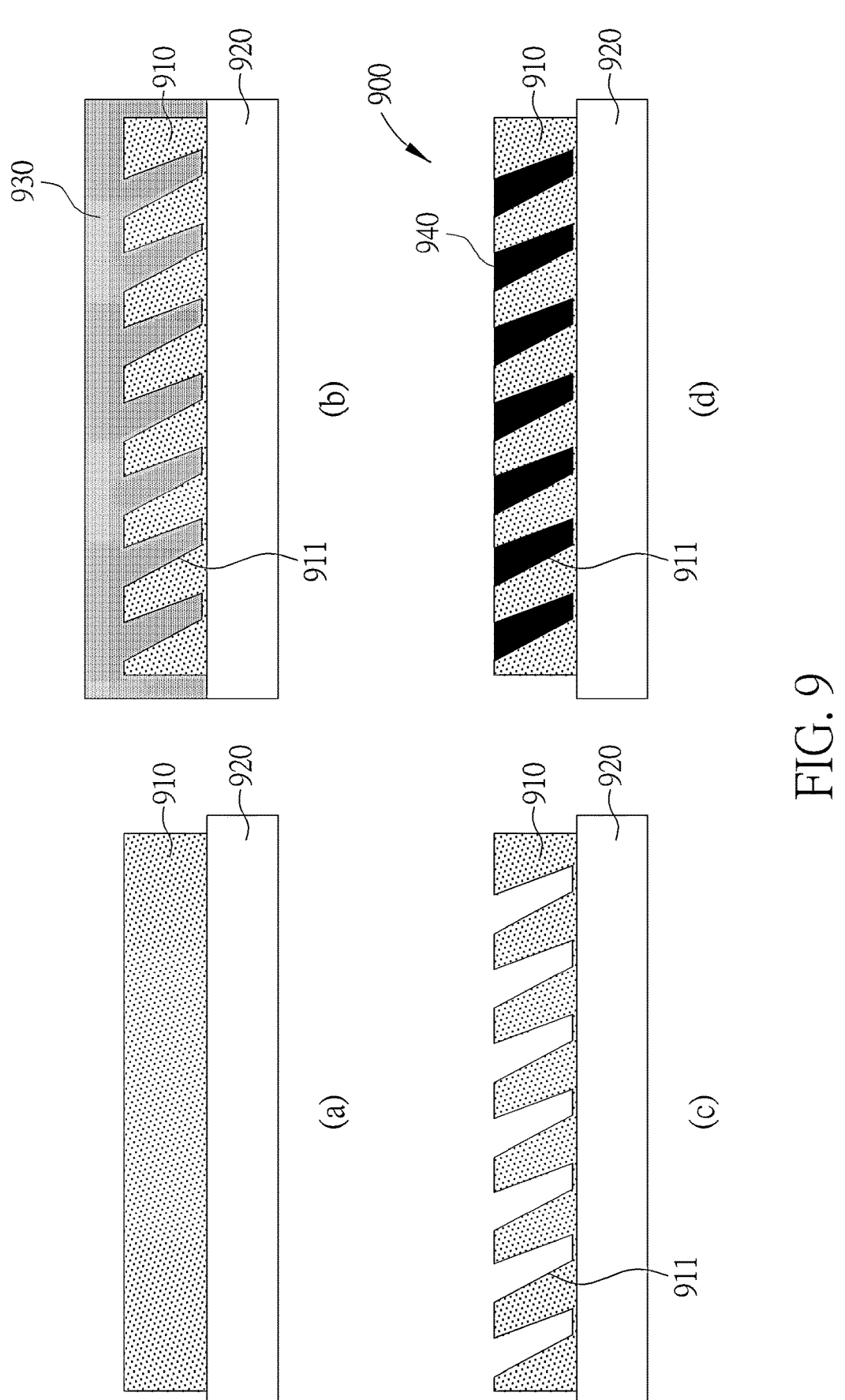
FIG. 9(a)-FIG. 9(d) are schematic diagrams of a manufacturing process of a light controlling means according to an example of the present invention.

FIG. 9(a)-FIG. 9(d) are schematic diagrams of a manufacturing process of a light controlling means 900 according to an example of the present invention. The light controlling means 900 can be applied to the light controlling means 520 in FIG. 5, the light controlling means 620 in FIG. 6 and the light controlling means 820 in FIG. 8, but is not limited herein. In FIG. 9(a), a transparent substance 910 (e.g., a resin) is disposed on a substrate 920. In FIG. 9(b), an imprinting mold 930 is pressed into the transparent substance 910, so that the transparent substance 910 forms a plurality of grooves 911. Then, a shape of the transparent substance 910 is cured, e.g., via a curing technology (e.g., ultraviolet rays (UV) and thermal curing the shape of the transparent substance 910), but is not limited herein. Then, the imprint mold 930 is demolded. The plurality of grooves 911 of the transparent substance 910 are shown in FIG. 9(c). In FIG. 9(d), a light-absorbing material 940 is filled into the plurality of grooves 911 of the transparent substance 910, to generate the light controlling means 900. In one example, the light-absorbing material can be replaced with a switchable light-absorbing material. In one example, the shape of the light-absorbing material or the switchable light-absorbing material may be cured via the curing technique. In one example, the transparent substance 910 of the light controlling means 900 may be applied to the plurality of insulators 522 in FIG. 5, the plurality of insulators 622 in FIG. 6 and the plurality of insulators 822 in FIG. 8, but not limited herein. In one example, the light-absorbing material 940 of the light controlling means 900 may be applied to the plurality of collimating walls 524 in FIG. 5, the plurality of collimating walls 624 in FIG. 6 and the plurality of collimating walls 824 in FIG. 8, but not limited herein. In one example, the light-absorbing material 940 may be completely or partially filled into the plurality of grooves 911.

Figure 10:
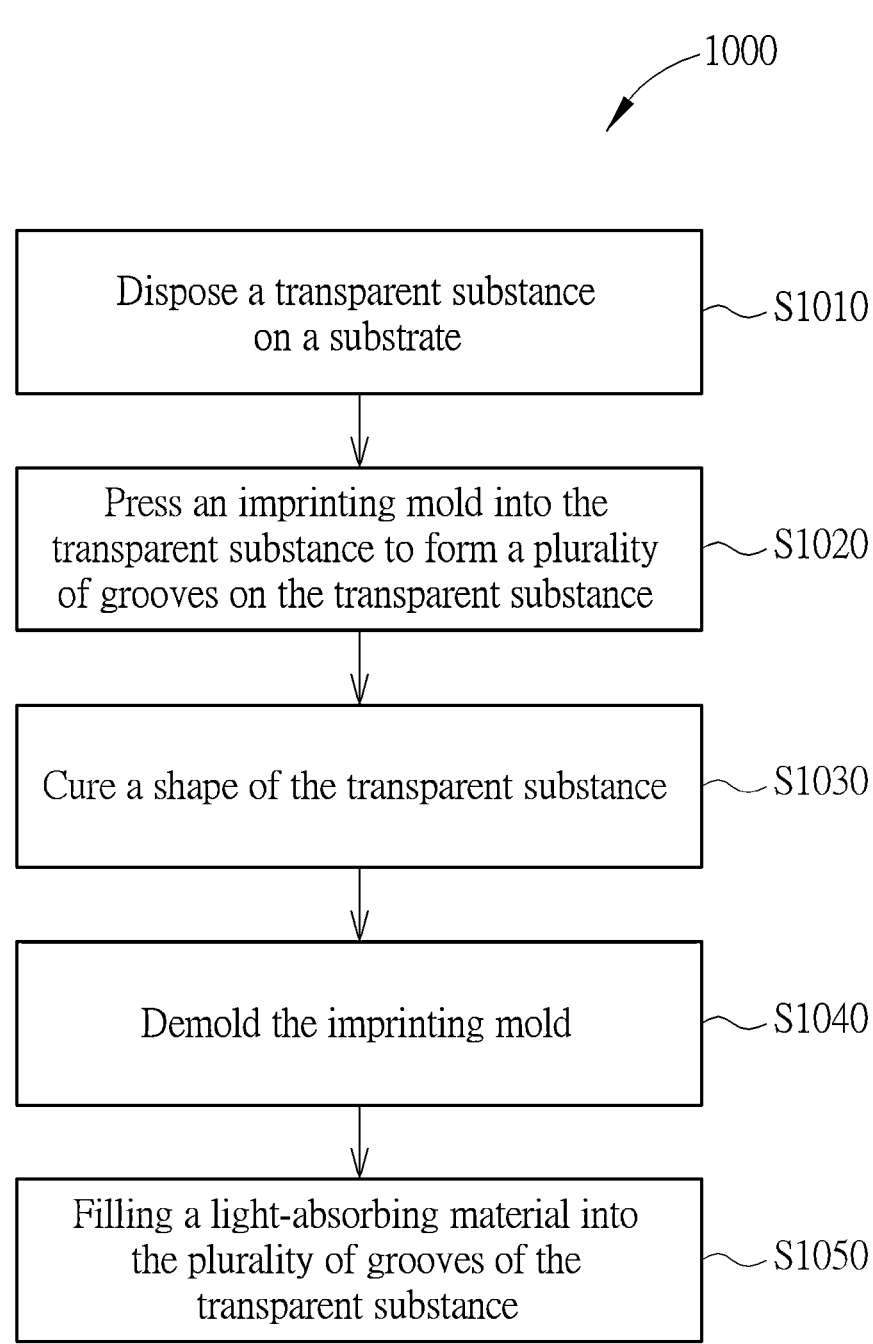
FIG. 10 is a flowchart of a manufacturing process of a light controlling means according to an example of the present invention.

The manufacturing process of the light controlling means 900 may be summarized as a process 1000, as shown in FIG. 10. The process 1000 comprises the following steps:

S1010: Dispose a transparent substance on a substrate.

S1020: Press an imprinting mold into the transparent substance to form a plurality of grooves on the transparent substance.

S1030: Cure a shape of the transparent substance.

S1040: Demold the imprinting mold.

S1050: Filling a light-absorbing material into the plurality of grooves of the transparent substance.

The process 1000 is utilized to exemplify the manufacturing method of the light controlling means 900. The detailed description and changes can be referred to the above description, and is not narrated herein. In one example, the process 1000 may comprise other steps, and the sequence of the steps may be adjusted arbitrarily according to the situation, and is not limited herein.

To sum up, the present invention provides a display device comprising a light emitting unit and a light controlling means. An angle of a light generated by the light emitting unit is restricted by the light controlling means, to reduce the probability of a light reflection after the light is reflected by a transflective object, and to ensure a driving safety.

Although the embodiments and advantages thereof in the present disclosure have been disclosed as above, it should be understood that those skilled in the art in the related technical field can make changes, substitutions, and decorations without departing from the spirit and the scope of this disclosure. Additionally, the scope of the protected range of this disclosure is not limited to the processes, machines, manufacturing, material compositions, devices, methods, and steps in the specific embodiments described in the description. Those skilled in the art may understand the current or future development of processes, machines, manufacturing, material composition, devices, methods and steps from the disclosed contents in this disclosure, as long as the substantially same functions carried out in the described embodiments or the substantially same results obtained in the described embodiments may be used in accordance with the present disclosure. Therefore, the protection scope of the present disclosure includes the above-mentioned processes, machines, manufacturing, material composition, devices, methods and steps. Additionally, each claim constitutes a separate embodiment, and the protection scope of the present disclosure also includes a combination of the claims and the embodiments. The protection scope of the present disclosure shall be determined by the scope of the claims listed below.

The above description is only related to the embodiments of the present invention, but not used for limiting the present invention. Those skilled in the art will readily observe that the present invention may have numerous modifications and alterations. Any modifications, equivalents replacements, improvements, etc. made in the spirits and principles of the present invention should be construed as the appended claims of the present invention.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device having a first region adjacent to a transflective object in a vehicle, comprising:

a first light emitting element disposed in the first region; and a light controlling means disposed on a route that a first light and a second light emitted from the first light emitting element propagate, through which the first light is controlled to propagate out of the display device at a first angle ranged from 30 degrees to 45 degrees and toward the transflective object and the second light is controlled to propagate out of the display device at a second angle ranged from 0 degrees to 5 degrees, wherein the first angle is between a normal direction of the display device and the first light controlled through the light controlling means, and the second angle is between the normal direction of the display device and the second light controlled through the light controlling means, wherein a first ratio of a light intensity of the first light to that of the second light is less than or equal to 14%.

2. The display device of claim 1, further having a second region adjacent to another transflective object disposed opposite to the transflective object in the vehicle, the display device further comprising:

a second light emitting element disposed in the second region.

3. The display device of claim 2, wherein the first light emitting element and the second light emitting element are disposed on a substrate.

4. The display device of claim 2, wherein the light controlling means is disposed on a route that a third light emitted from the second light emitting element propagates.

5. The display device of claim 4, wherein the third light is controlled through the light controlling means to propagate out of the display device at a third angle ranged from 55 degrees to 70 degrees toward the another transflective object, wherein the third angle is between the normal direction of the display device and the third light controlled through the light controlling means.

6. The display device of claim 1, wherein the first ratio is less than or equal to 11%.

7. The display device of claim 1, wherein the light controlling means comprises a plurality of collimating walls.

8. The display device of claim 7, wherein the light controlling means further comprises a first electrode and a second electrode, and the plurality of collimating walls are disposed between the first electrode and the second electrode.

9. The display device of claim 8, wherein an electricity is capable of being applied to the light controlling means through the first electrode and the second electrode to control the first angle and the second angle.

10. The display device of claim 9, wherein the plurality of collimating walls comprises a switchable light-absorbing material.

* * * * *